(12) United States Patent
Kojima

(10) Patent No.: US 11,131,851 B2
(45) Date of Patent: Sep. 28, 2021

(54) VIRTUAL IMAGE DISPLAY DEVICE

(71) Applicant: JVCKENWOOD Corporation, Yokohama (JP)

(72) Inventor: Daisuke Kojima, Yokohama (JP)

(73) Assignee: JVCKENWOOD CORPORATION, Yokohama (JP)

( * ) Notice: Subject to any disclaimer, the term of this patent is extended or adjusted under 35 U.S.C. 154(b) by 160 days.

(21) Appl. No.: 16/656,616

(22) Filed: Oct. 18, 2019

(65) Prior Publication Data

US 2020/0049988 A1 Feb. 13, 2020

Related U.S. Application Data

(63) Continuation of application No. PCT/JP2018/038341, filed on Oct. 15, 2018.

(30) Foreign Application Priority Data

Jan. 12, 2018 (JP) .............................. JP2018-003134

(51) Int. Cl.
*G03B 21/28* (2006.01)
*G02B 27/01* (2006.01)

(52) U.S. Cl.
CPC ......... *G02B 27/0101* (2013.01); *G03B 21/28* (2013.01); *G02B 2027/011* (2013.01); *G02B 2027/012* (2013.01)

(58) Field of Classification Search
CPC .. G03B 21/005; G03B 21/006; G03B 21/008; G03B 21/28; G03B 21/145; G03B 21/208; G03B 21/2013; G03B 21/2033; G03B 21/2053; G03B 21/2066; G02B 27/01; G02B 27/0101; G02B 27/0149; G02B 27/0179; G02B 27/4211; G02B 2027/011; G02B 2027/012; G02B 2027/0141; G02B 2027/0149; G02B 2027/0179;

(Continued)

(56) References Cited

U.S. PATENT DOCUMENTS

2017/0285338 A1* 10/2017 Narushima ............ G09G 3/002
2019/0265582 A1* 8/2019 Sakai .................. G02B 27/0101

FOREIGN PATENT DOCUMENTS

EP 0420228 A2 4/1991
EP 2851735 A1 3/2015
(Continued)

*Primary Examiner* — Sultan Chowdhury
(74) *Attorney, Agent, or Firm* — Brundidge & Stanger, P.C.

(57) ABSTRACT

A virtual image display device includes a projection optical system that includes a projection mirror that projects an image display light toward a first concavely curved surface of a virtual image presentation plate. The projection mirror has a second concavely curved surface and is arranged such that a direction orthogonal to both a direction of incidence and a direction of reflection of the image display light on the first concavely curved surface and a direction orthogonal to both a direction of incidence and a direction of reflection of the image display light on the second concavely curved surface are orthogonal to each other. The display unit is provided at a focal point of a composite optical system within a meridional plane, the composite optical system being formed by the virtual image presentation plate and the projection optical system.

4 Claims, 6 Drawing Sheets

(58) Field of Classification Search
CPC ........ G02B 2027/0185; B60K 2370/23; B60K 2370/31; B60K 2370/155; B60K 2370/334; B60K 2370/336; B60K 2370/1529
See application file for complete search history.

(56) References Cited

FOREIGN PATENT DOCUMENTS

| | | | |
|---|---|---|---|
| GB | 2458898 | A | 10/2009 |
| JP | S62225429 | A | 10/1987 |
| JP | S62275846 | A | 11/1987 |
| JP | 2017-146424 | A | 8/2017 |
| WO | 94/14098 | A1 | 6/1994 |

\* cited by examiner

VIRTUAL IMAGE DISPLAY DEVICE

CROSS REFERENCE TO RELATED APPLICATION

Priority is claimed to Japanese Patent Application No. 2018-003134, filed on Jan. 12, 2018, the entire content of which is incorporated herein by reference.

BACKGROUND OF THE INVENTION

1. Field of the Invention

The present invention relates to a virtual image display device.

2. Description of the Related Art

Recently, head-up displays are available for use as display devices for vehicles. A head-up display projects an image display light toward, for example, a windshield of a vehicle, superimposes a virtual image based on the image display light on the scenery outside the vehicle, and displays the resultant image. A windshield has two interfaces inside and outside the vehicle. The image display lights reflected at the respective interfaces and visually perceived may be superimposed with a shift and viewed as double images. To inhibit double images from being produced, there is proposed a mathematical expression for defining a viewing distance to contain the amount of shift between double images within the resolution of the human eyes and obtaining an optical arrangement that realizes the viewing distance.

SUMMARY OF THE INVENTION

The technology described above requires a large viewing distance to the position of presentation of a virtual image ahead of the user in order to reduce double images. It is preferred to reduce the occurrence of double images suitably, regardless of the viewing distance to a virtual image.

The embodiments address the above-described issue, and a general purpose thereof is to provide a technology for improving the visibility of a virtual image presented.

An embodiment of the present invention relates to a virtual image display device for presenting a virtual image to a user via a virtual image presentation plate, including: a display unit that generates an image display light; and a projection optical system that includes a projection mirror that projects the image display light toward the virtual image presentation plate such that the image display light is incident and reflected on a first concavely curved surface of the virtual image presentation plate diagonally. The projection mirror has a second concavely curved surface on which the image display light is incident and reflected diagonally and is arranged such that a direction orthogonal to both a direction of incidence and a direction of reflection of the image display light on the first concavely curved surface and a direction orthogonal to both a direction of incidence and a direction of reflection of the image display light on the second concavely curved surface are orthogonal to each other. The display unit is provided at a focal point of a composite optical system within a meridional plane, the composite optical system being formed by the virtual image presentation plate and the projection optical system, and the focal point of the composite optical system within the meridional plane is a position of convergence of parallel beams assumed to be incident from the user toward the virtual image presentation plate along the meridional plane of the virtual image presentation plate.

Optional combinations of the aforementioned constituting elements, and mutual substitution of constituting elements and implementations of the present invention between methods, apparatuses, and systems may also be practiced as additional modes of the present invention.

BRIEF DESCRIPTION OF THE DRAWINGS

Embodiments will now be described by way of examples only, with reference to the accompanying drawings which are meant to be exemplary, not limiting and wherein like elements are numbered alike in several Figures in which.

DETAILED DESCRIPTION OF THE PREFERRED EMBODIMENT

The invention will now be described by reference to the preferred embodiments. This does not intend to limit the scope of the present invention, but to exemplify the invention.

A description will be given of embodiments of the present invention with reference to the drawings. Specific numerical values are shown in the embodiments by way of example only to facilitate the understanding of the invention and should not be construed as limiting the scope of the invention unless specifically indicated as such. Those elements in the specification and drawings that have substantially the identical function and configuration are represented by the same reference symbols, and the description is not duplicated. Elements not directly relevant to the invention are omitted from the illustration.

Figure 1:
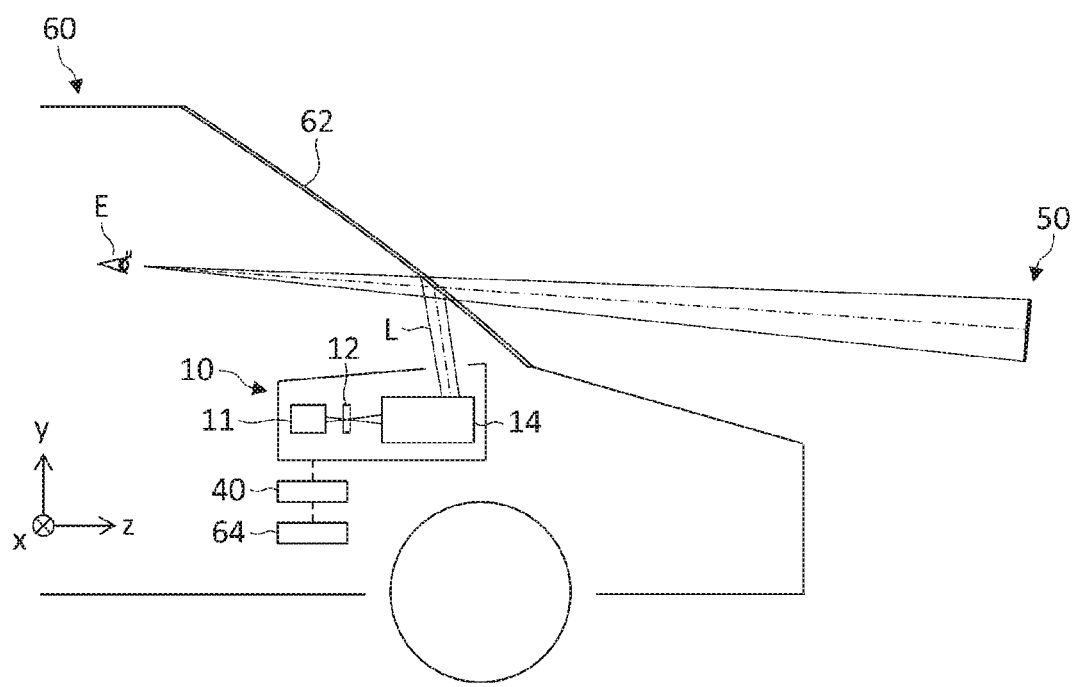
FIG. 1 schematically shows a configuration of a virtual image display device according to the embodiment.

FIG. 1 schematically shows a configuration of a virtual image display device 10 according to the embodiment. In this embodiment, the virtual image display device 10 is installed in a dashboard of a vehicle 60, which exemplifies a moving object. The virtual image display device 10 is a so-called head-up display device. The virtual image display device 10 presents a virtual image 50 in front of the vehicle 60 in the direction of travel (rightward direction in FIG. 1) by projecting an image display light toward a windshield 62, which is a virtual image presentation plate. The user E (e.g., the driver) can see the virtual image 50 superimposed on the actual scenery via the windshield 62. Therefore, the driver E can access information shown in the virtual image 50 substantially without moving the line of sight while driving the vehicle. Referring to the FIG. 1, the direction of travel of the vehicle 60 (longitudinal direction) is defined as the z direction, the vertical direction of the vehicle 60 (up/down direction) is defined as the y direction, and the transversal direction of the vehicle 60 is defined as the x direction.

The virtual image display device 10 includes an illumination unit 11, a display unit 12, a projection optical system 14, and a control unit 40. The illumination unit 11 is a light source for generating a display light and generates an illumination light for illuminating the display unit 12. The illumination unit 11 includes a light emitting device such as a light emitting diode (LED) and a laser diode (LD), and an optical device for adjusting the light intensity distribution and angle distribution of the light output from the light emitting device. The illumination unit 11 provides the display unit 12 with a substantially uniform white light. The configuration of the illumination unit 11 is not limited to any particular type. For example, a light emitting device such as a light tunnel, a Fresnel lens, and a light diffusion plate may be used to condition the output light from the light emitting device.

The display unit 12 modulates an illumination light from the illumination unit 11 to generate a display light and forms an intermediate image (real image) corresponding to the display content of the virtual image 50. The display unit 12 includes an image display device of transmission type for generating a display light. For example, the display unit 12 includes a display device such as a liquid crystal panel of transmission type. The image display device receives an image signal transmitted from the control unit 40 and generates an image display light for the display content corresponding to the image signal. The display unit 12 may further include an optical device for conditioning the orientation and light distribution angle of the image display light. Further, the display unit 12 may be configured by combining an element other than a liquid crystal panel of transmission type and a screen of transmission type such as a microlens array sheet and a light diffusion sheet. The element is exemplified by a projection unit such as a digital micromirror device (DMD), a liquid crystal on silicon (LOCS) laser scanning module (LSM), and a micro electro mechanical system (MEMS) LSM.

The projection optical system 14 projects the image display light generated by the display unit 12 toward the windshield 62. The projection optical system 14 includes an optical device of transmission type such as a convex lens and an optical device of reflection type such as a concave mirror. The specific configuration of the projection optical system 14 will be described separately.

The control unit 40 generates an image for display and causes the illumination unit 11 and the display unit 12 to operate to present the virtual image 50 corresponding to the image for display. The control unit 40 is connected to an external device 64 and generates the image for display based on the information from the external device 64.

The external device 64 is a device for generating original data for an image displayed as the virtual image 50. For example, the external device 64 may be an Electronic Control Unit (ECU) for the vehicle 60, a navigation device, or a mobile device such as a cell phone, smartphone, and tablet. The external device 64 transmits, to the control unit 40, image data necessary to display the virtual image 50, information indicating the content and type of the image data, and information related to the vehicle 60 such as the speed and current position of the vehicle 60.

Before describing the optical arrangement according to the embodiment in detail, a description will be given of the occurrence of double images with reference to a comparative example. One factor that causes the virtual image 50 to be viewed as double images is that the image display lights reflected at the two interfaces of the windshield 62 inside and outside the vehicle and visually perceived are presented with a shift.

Figure 2:
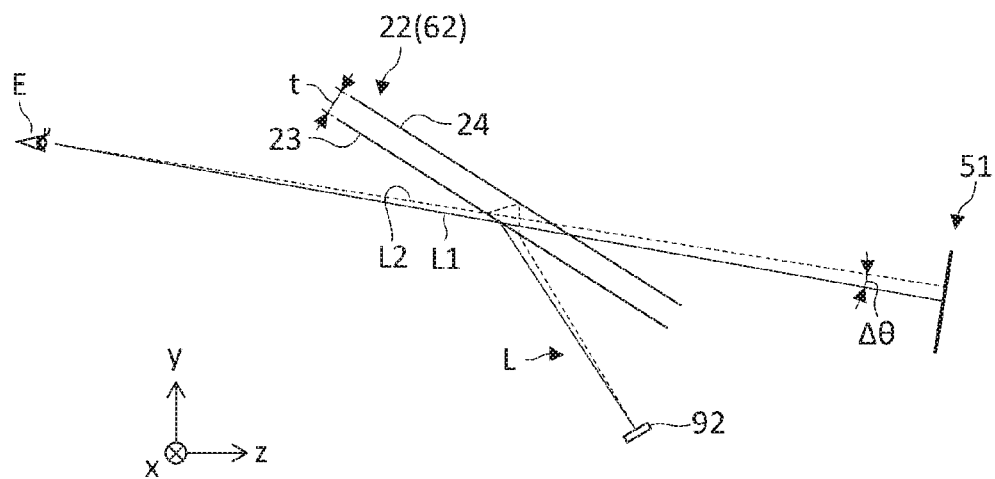
FIG. 2 schematically shows the occurrence of double images induced by the virtual image presentation plate.

FIG. 2 schematically shows the occurrence of double images induced by the virtual image presentation plate 22. In FIG. 2, an optical device such as a concave mirror provided between the virtual image presentation plate 22 and a display unit 92 is omitted for simplify the description. The virtual image presentation plate 22 has a predetermined thickness t and has a first surface 23 and a second surface 24. The first surface 23 corresponds to the interface of the windshield 62 inside the vehicle, and the second surface 24 corresponds to the interface of the windshield 62 outside the vehicle.

The image display light arriving at the user E from an arbitrary point E of the display unit 92 mainly travels on two light paths L1, L2. The first light path L1 is a light path in which the light is reflected by the first surface 23 and travels toward the user E. The second light path L2 is a light path in which the light is refracted by the first surface 23, reflected by the second surface 24, and then re-refracted by the first surface 23 and travels toward the user E. If there is an angular difference $\Delta\theta$ between the first light path L1 and the second light path L2 leading toward the user E, the image display lights traveling on the two light paths L1, L2 respectively are visually perceived as being shifted from each other according to the angular difference $\Delta\theta$, producing double images in a virtual image 51. While it is possible to assume a light path in which the light is reflected multiple times between the first surface 23 and the second surface 24 and travels toward the user E, the component of the image display light reflected multiple times and traveling toward the user E is small and can be neglected in a normal mode of usage.

Figure 3:
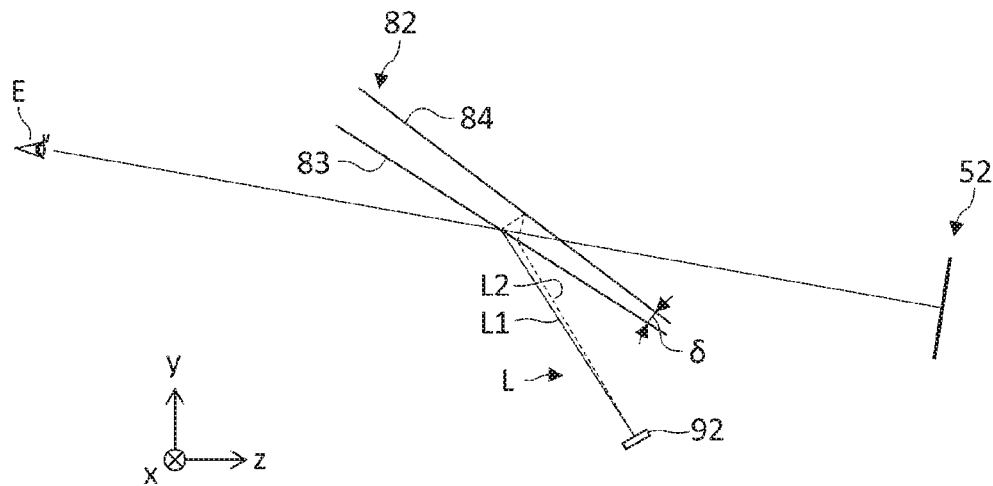
FIG. 3 schematically shows inhibition of double images effected by a wedge glass.

FIG. 3 schematically shows inhibition of double images effected by a wedge glass. A virtual image presentation plate 82 shown in FIG. 3 is a so-called "wedge glass" and is configured such that the thickness of the virtual image presentation plate 82 varies depending on the location. This results in a first surface 83 and a second surface 84 of the virtual image presentation plate 82 having mutually different angles of inclination relative to a direction of line of sight of the user E, and an angular difference $\delta$ is provided between the surfaces. By using a wedge glass in which the angular difference $\delta$ is provided between the two surfaces 83, 84, the angular difference $\Delta\theta$ between the first light path L1 and the second light path L2 as shown in FIG. 2 is corrected, and a virtual image 52 in which double images are reduced is presented.

However, a "wedge glass" like this need be formed by controlling the angular difference $\delta$ with high precision and so is more expensive than an ordinary glass having a uniform thickness t. Further, forming the windshield 62 of the vehicle 60 by using a wedge glass not only requires a dedicated wedge glass adapted to the shape of the vehicle 60 but also requires replacing the entirety of the windshield 62 so that a heavy cost will be incurred. It is therefore preferred to reduce the occurrence of double images without using a special wedge glass.

Figure 4:
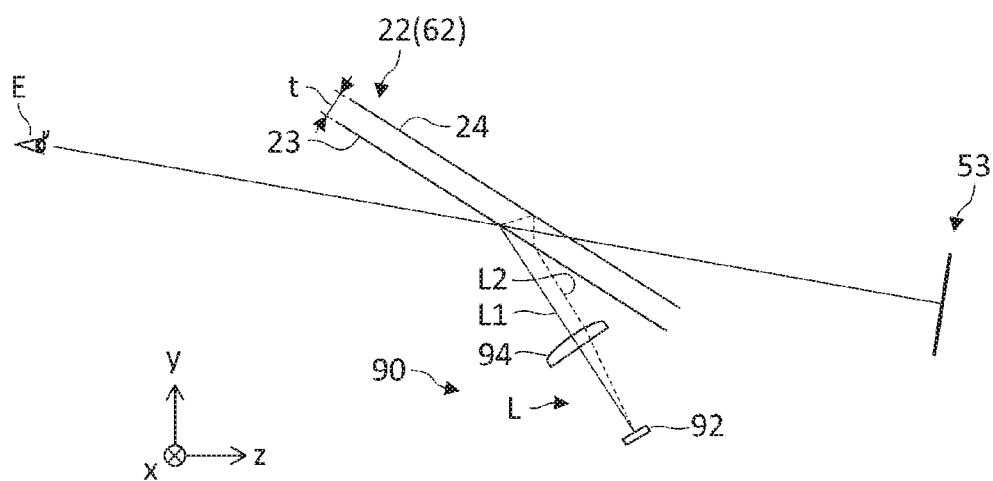
FIG. 4 shows an optical arrangement in a virtual image display device according to the comparative embodiment in detail.

FIG. 4 shows an optical arrangement in a virtual image display device 90 according to the comparative embodiment in detail. The comparative example differs from the configuration of FIG. 2 in that a convex lens 94 is provided between the virtual image presentation plate 22 and the display unit 92. Thus, according to the comparative example, the angular difference between the first light path L1, in which the light leaving an arbitrary point on the display unit 92 and reflected by the first surface 23 of the virtual image presentation plate 22, and the second light path L2, in which the light is reflected by the second surface 24 of the virtual image presentation plate 22, is reduced by providing the convex lens 94. In particular, by providing the display unit 92 at the focal point of the composite optical system formed by the virtual image presentation plate 22 and the convex lens 94, the angular difference between the first light path L1 and the second light path L2 is removed and double images are eliminated.

In the comparative example of FIG. 4, the image display light L is caused to be diagonally incident on the virtual image presentation plate 22 so that astigmatism could be produced if the virtual image presentation plate 22 includes a curved surface. The windshield 62 of automobiles in general includes a curved surface and is configured such that the first surface 23 is concavely curved so that diagonal incidence of the image display light L on the concavely curved surface produces astigmatism. "Astigmatism" is defined here as non-coincidence of the focal point of the composite optical system within the meridional plane and the focal point within the sagittal plane. Astigmatism produces a shift between the imaging position of the virtual image 53 in the horizontal direction (x direction) and the imaging position in the vertical direction (y direction) and results in reduction of the imaging performance. The term "meridional plane" refers to a plane that includes the light axis of the composite optical system and the principal ray of the image display light L. The yz plane in FIG. 4 represents the meridional plane. Meanwhile, the term "sagittal plane" refers to a plane that includes the light axis of the composite optical system and is a plane perpendicular to the meridional plane. The xz plane in FIG. 4 represents the sagittal plane.

Figure 5A:
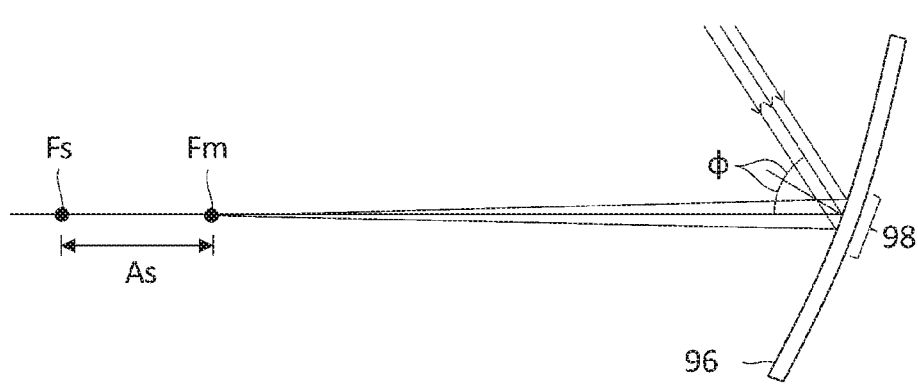
FIGS. 5A and 5B schematically show the astigmatism of parallel beams incident on a partial region on a concavely curved surface.
Figure 5B:
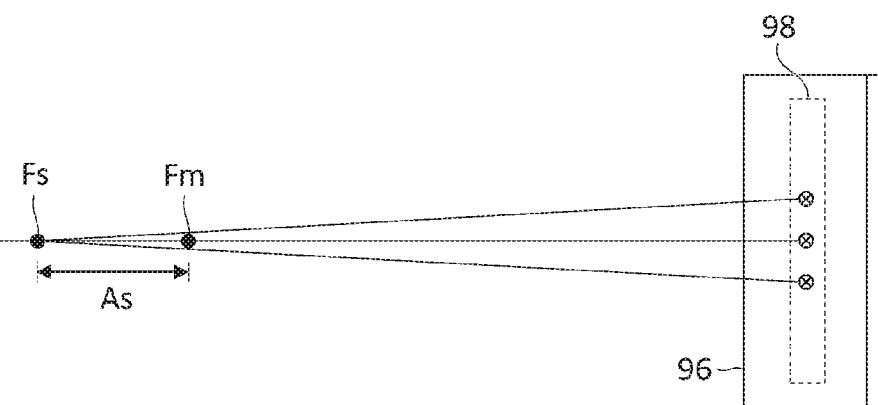

FIGS. 5A and 5B schematically show the astigmatism of parallel beams incident on a partial region 98 on a concavely curved surface 96 and show views from different points of view. FIG. 5A shows light beams within the meridional plane (yz plane) of the concavely curved surface 96, and FIG. 5B shows light beams within the sagittal plane (xz plane) of the concavely curved surface 96. As illustrated, the points of convergence Fm and Fs of the parallel beams differ between the meridional plane and the sagittal plane. The focal point Fs within the sagittal plane is located farther from the concavely curved surface 96 than the focal point Fm within the meridional plane. This is because of the fact that, when parallel light beams are caused to be diagonally incident on a concave mirror, the distance to the position of convergence of light (i.e., the focal distance) could change in accordance with the angle of incidence. Denoting the focal distance of the concave mirror by f and the angle of incidence and reflection of light on the concave mirror by φ, the focal distance of diagonally incident light is given by f·cos φ. The larger the angle of incidence and reflection φ, the smaller the focal distance f·cos φ. In other words, the focal distance within the meridional plane on which the light beam is diagonally incident will be shortened to f·cos φ. Meanwhile, the focal distance within the sagittal plane will be enlarged to f/cos φ.

In order to reduce the astigmatism As defined as a shift between the focal point Fm within the meridional plane and the focal point Fs within the sagittal plane, the angle of incidence and reflection φ on the concavely curved surface 96 may be reduced. However, it is not realistic to reduce the angle of incidence and reflection φ of the image display light L on the virtual image presentation plate 22 significantly. This is addressed in this embodiment by configuring the projection optical system 14 to reduce the astigmatism in the composite optical system formed by the virtual image presentation plate 22 and the projection optical system 14 as a whole. More specifically, mitigation of the occurrence of double images and reduction of the astigmatism in the composite optical system are both achieved by using one or more of the features listed in (1)-(5) below.

(1) Arrange the virtual image presentation plate and the concave mirror at twisted positions.
(2) Arrange projection mirrors having different curvatures in the sagittal direction and in the meridional direction.
(3) Insert a plane parallel plate an angle to the light axis.
(4) Combine two concave mirrors at mutually twisted positions.
(5) Arrange a projection mirror having a surface oppositely curved (having the opposite concavo-convex shape) relative to the virtual image presentation plate.

First Embodiment

Figure 6A:
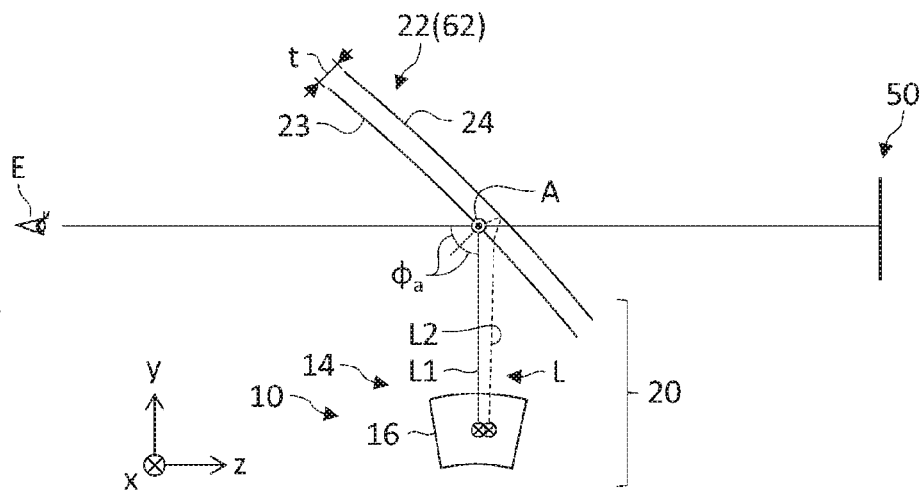
FIGS. 6A, 6B, and 6C show a configuration of the virtual image display device according to the first embodiment in detail.
Figure 6B:
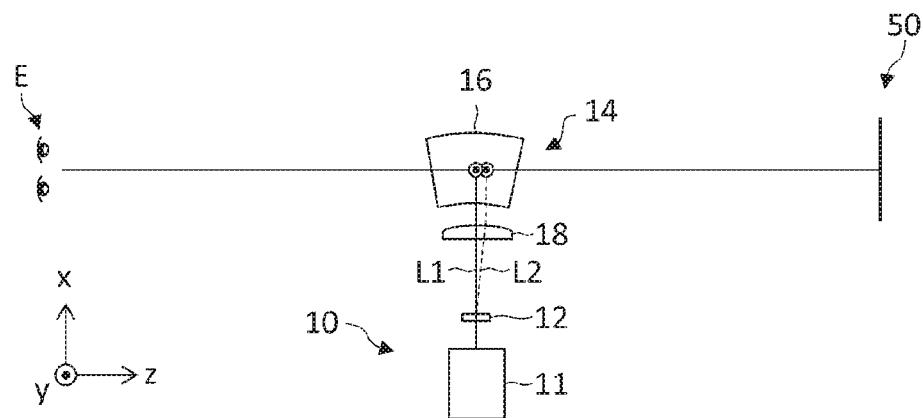
Figure 6C:
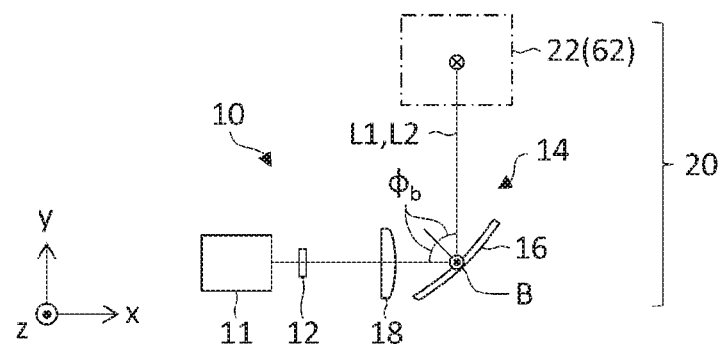

FIGS. 6A-6C show a configuration of the virtual image display device 10 according to the first embodiment in detail and show views from different points of view. FIG. 6A corresponds to FIG. 1 and shows a configuration viewed on the yz plane. FIG. 6B shows a configuration viewed on the xz plane, and FIG. 6C shows a configuration viewed on the xy plane. The embodiment uses the feature (1) above, the concave mirror 16 included in the projection optical system 14 is arranged at a position twisted with respect to the virtual image presentation plate 22.

The virtual image display device 10 includes an illumination unit 11, a display unit 12, and a projection optical system 14. The projection optical system 14 includes a concave mirror 16 and a convex lens 18. The illumination unit 11, the display unit 12, the convex lens 18, and the concave mirror 16 are arranged on the light axis extending in the x direction. The concave mirror 16 reflects, toward the virtual image presentation plate 22 and in the y direction, the image display light L incident in the x direction. The virtual image presentation plate 22 reflects, toward the user E and in the z direction, the image display light L incident in the y direction.

The virtual image presentation plate 22 is configured such that the first surface 23 is concavely curved. The first surface 23 of the virtual image presentation plate 22 is a first concavely curved surface on which the image display light L is incident and reflected diagonally. The virtual image presentation plate 22 is configured to have a uniform thickness t, and the curved surfaces of the first surface 23 and the second surface 24 are identically shaped. The virtual image presentation plate 22 is arranged such that the direction (axis A) orthogonal to both the direction of incidence and the direction of reflection of the image display light L on the first surface 23 (first concavely curved surface) is the x direction.

The concave mirror 16 is a projection mirror that projects the image display light L toward the virtual image presentation plate 22. The convex lens 18 is provided between the display unit 12 and the concave mirror 16. The concave mirror 16 has a second concavely curved surface on which the image display light L is incident and reflected diagonally and is arranged such that the direction (axis B) orthogonal to both the direction of incidence and the direction of reflection of the image display light L on the second concavely curved surface is the z direction. Therefore, the orientation of the axis B of the concave mirror 16 is orthogonal to the orientation of the axis A of the virtual image presentation plate 22, and the concave mirror 16 and the virtual image presentation plate 22 are in a twisted arrangement.

In this embodiment, the virtual image presentation plate 22 and the concave mirror 16 are in a twisted arrangement so that the astigmatism produced in the virtual image presentation plate 22 and the astigmatism produced in the concave mirror 16 occur in the opposite directions. Assuming, for example, that parallel beams are incident on the meridional plane (yz plane) of the virtual image presentation plate 22, the parallel beams are reflected by the virtual image presentation plate 22 and the concave mirror 16 and are transmitted through the convex lens 18, before being converged on the light axis of the display unit 12 in the x direction within the xz plane. Therefore, the virtual image presentation plate 22 operates, on the light axis of the display unit 12, to shorten the focal distance of the light beam within the xz plane and enlarge the focal distance of the light beam within the xy plane. Meanwhile, the concave mirror 16 operates to shorten the focal distance of the light beam within the xy plane and shorten the focal distance of the light beam within the xz plane. Therefore, by combining the virtual image presentation plate 22 and the concave mirror 16 in a twisted arrangement like this, the astigmatism is reduced as compared with a case where the concave mirror 16 in a twisted arrangement is not provided.

For reduction of the astigmatism in the composite optical system 20 in which the concave mirror 16 and the virtual image presentation plate 22 are combined, it will be necessary to ensure that the astigmatism in the concave mirror 16 and that of the virtual image presentation plate 22 are substantially equal. More specifically, this requires ensuring that the product $f_a \cdot \cos \varphi_a$ of the focal distance fa of the concave mirror 16 and the cosine $\cos \varphi_a$ of the angle of incidence and reflection of the image display light L on the concave mirror 16 is substantially equal to the product $f_b \cdot \cos \varphi_b$ of the focal distance fb of the virtual image presentation plate 22 and the cosine $\cos \varphi_b$ of the angle of incidence and reflection of the image display light L on the virtual image presentation plate 22. For example, reduction of the imaging performance caused by astigmatism is suitably prevented by designing the device such that the focal distance $f_a \cdot \cos \varphi_a$ of the concave mirror 16 within the meridional pane is not less than 0.5 times and not more than twice the focal distance $f_b \cdot \cos \varphi_b$ of the virtual image presentation plate 22 within the meridional plane.

Further, by providing the display unit 12 at the focal point within the meridional plane of the composite optical system 20 formed by the convex lens 18 and the virtual image presentation plate 22, the occurrence of double images caused by the virtual image presentation plate 22 having the two surfaces 23 and 24 is eliminated. The focal point of the composite optical system 20 within the meridional plane is the position of convergence of parallel beams assumed to be incident from the user E toward the virtual image presentation plate 22 along the meridional plane (yz plane) of the virtual image presentation plate 22.

According to this embodiment, the occurrence of double images is mitigated without using a virtual presentation image of a customized specification such as a wedge glass, by providing the display unit 12 at the focal point of the composite optical system 20 within the meridional plane. Further, by providing the concave mirror 16 in a twisted arrangement with respect to the virtual image presentation plate 22, the astigmatism in the composite optical system 20 is reduced and reduction of the imaging performance caused by astigmatism is prevented. This can enhance the visibility of the virtual image 50 presented to the user E.

Second Embodiment

Figure 7:
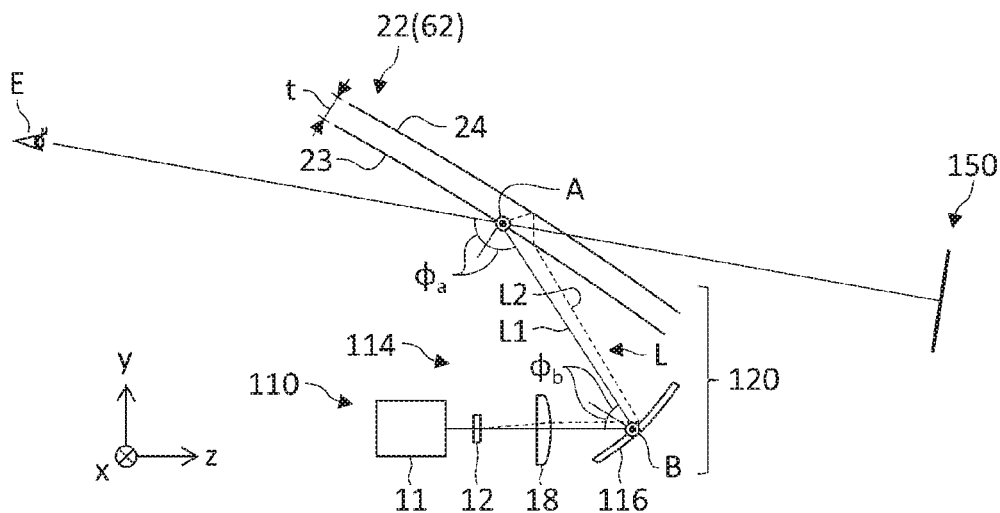
FIG. 7 shows a configuration of a virtual image display device according to the second embodiment in detail.

FIG. 7 shows a configuration of a virtual image display device 110 according to the second embodiment in detail. This embodiment differs from the first embodiment in that the axis A of the virtual image presentation plate 22 and the axis B of a concave mirror 116 are aligned in the same direction (x direction), and the concave mirror 116 is not in a twisted arrangement with respect to the virtual image presentation plate 22.

The virtual image display device 110 includes an illumination unit 11, a display unit 12, and a projection optical system 114. The projection optical system 114 includes a concave mirror 116 and a convex lens 18. The concave mirror 116 is a projection mirror having a concavely curved surface on which the image display light L is incident and reflected diagonally. The illumination unit 11, the display unit 12, the convex lens 18, and the concave mirror 116 are arranged on the light axis extending in the z direction. The concave mirror 116 reflects the image display light L incident in the z direction toward the virtual image presentation plate 22. The virtual image presentation plate 22 reflects the image display light L from the concave mirror 116 toward the user E.

The concave mirror 116 is configured such that the curvature within the meridional plane (first cross section) and the curvature within the sagittal plane (second cross section) are different in order to reduce the astigmatism in the composite optical system 120 formed by the projection optical system 114 and the virtual image presentation plate 22. The meridional plane of the concave mirror 116 is a plane (yz plane) that includes both the direction of incidence and the direction of reflection of the image display light diagonally incident on the concave mirror 116 and that intersects the concavely curved surface of the concave mirror 116. Meanwhile, the sagittal plane of the concave mirror 116 is a plane orthogonal to the meridional plane and is a plane that is along the direction (x direction) orthogonal to both the direction of incidence and the direction of reflection of the image display light and that intersects the concavely curved surface of the concave mirror 116. The curvature within the meridional plane is related to the focal distance of parallel beams incident along the meridional plane, i.e., related to the focal distance within the meridional plane. Meanwhile, the curvature within the sagittal plane is related to the focal distance within the sagittal plane.

In this embodiment, the focal point of the composite optical system 120 within the meridional plane and the focal point within the sagittal plane are made to coincide by appropriately setting the curvature of the concave mirror 116 within the meridional plane and the curvature within the sagittal plane. For example, the difference between the focal distance within the meridional plane and the focal distance within the sagittal plane is reduced by configuring the curvature of the concave mirror 116 within the meridional plane to be smaller than the curvature within the sagittal plane. It is preferred to set the specific curvature of the concave mirror 116 in accordance with the curvature of the virtual image presentation plate 22 within the meridional plane and the curvature thereof within the sagittal plane, the angle of incidence and reflection $\varphi_a$ of the image display light L on the virtual image presentation plate 22, and the angle of incidence and reflection $\varphi_b$ of the image display light L on the concave mirror 116.

According to this embodiment, the astigmatism in the composite optical system 120 is reduced and reduction of the imaging performance caused by astigmatism is prevented by configuring the curvature of the concave mirror 116 within the meridional plane and the curvature thereof within the sagittal plane to be different. Further, the occurrence of double images is inhibited by providing the display unit 12 at the focal point of the composite optical system 120 within the meridional plane. In this way, a highly visible virtual image 150 is presented to the user.

It should be noted that this embodiment is applicable to a case where the first surface 23 of the virtual image presentation plate 22 is a flat surface. In this case, the astigmatism in the virtual image presentation plate 22 is negligible. It therefore suffices to set the curvature of the concave mirror 116 within the meridional plane and the curvature thereof within the sagittal plane to have different values so as to reduce the astigmatism in the concave mirror 116.

Third Embodiment

Figure 8:
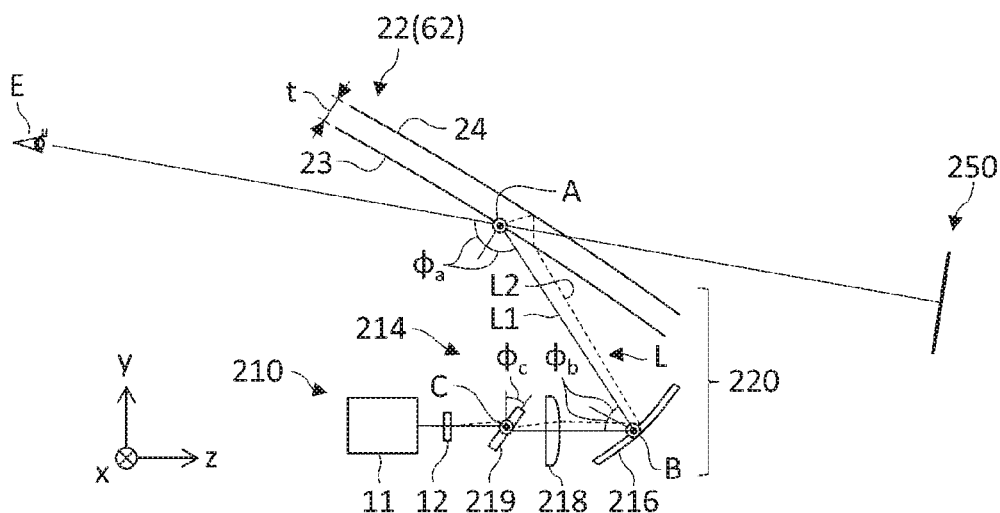
FIG. 8 shows a configuration of a virtual image display device according to the third embodiment in detail.

FIG. 8 shows a configuration of a virtual image display device 210 according to the third embodiment in detail. This embodiment differs from the foregoing embodiments in that a plane parallel plate 219 provided at an angle between the display unit 12 and a convex lens 218 is added.

The virtual image display device 210 includes an illumination unit 11, a display unit 12, and a projection optical system 214. The projection optical system 214 includes a concave mirror 216, a convex lens 218, and the plane parallel plate 219. The illumination unit 11, the display unit 12, the plane parallel plate 2149, the convex lens 218, and the concave mirror 216 are arranged on the light axis extending in the z direction.

The plane parallel plate 219 is a transparent member having a uniform thickness and is made of glass or a resin material. The plane parallel plate 219 is provided at an angle to the light path of the projection optical system 214 such that the rotational axis C is aligned with the direction (x direction) orthogonal to the meridional plate (yz plane). Inserting the plane parallel plate 219 at an angle enlarges the focal distance of a composite optical system 220 formed by the virtual image presentation plate 22 and the projection optical system 214. In particular, configuring the direction of the rotational axis C of the plane parallel plate 219 to be orthogonal to the meridional plane enlarges the focal distance within the meridional plane as compared with the focal distance within the sagittal plane. This reduces the difference between the focal distance within the meridional plane and the focal distance within the sagittal plane and mitigates the astigmatism as compared with a case where the plane parallel plate 219 is not inserted. The amount by which the focal distance increases by providing the plane parallel plate 219 depends on the angle of inclination $\varphi_c$ of the plane parallel plate 2219 so that the astigmatism can be adjusted by changing the angle of inclination $\varphi_c$.

According to this embodiment, the astigmatism in the composite optical system 220 is reduced by inserting the plane parallel plate 219. Further, the occurrence of double images is inhibited by providing the display unit 12 at the focal point of the composite optical system 220 within the meridional plane. This can enhance the visibility of a virtual image 250.

Fourth Embodiment

Figure 9A:
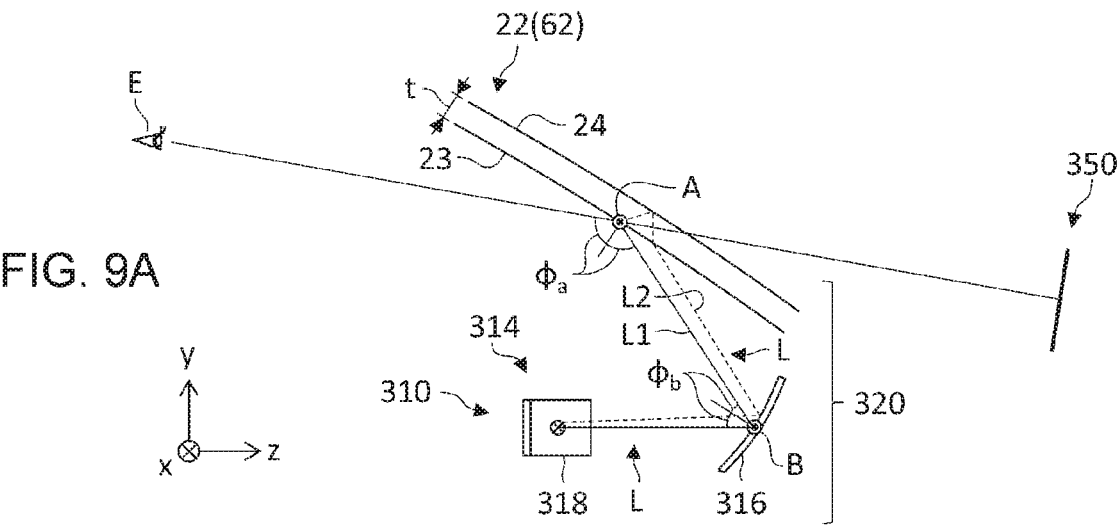
FIGS. 9A and 9B show a configuration of a virtual image display device according to the fourth embodiment in detail.
Figure 9B:
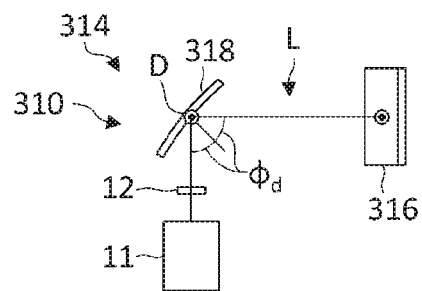

FIGS. 9A and 9B show a configuration of a virtual image display device 310 according to the fourth embodiment in detail and show views from different points of view. FIG. 9A corresponds to FIG. 1 and shows a configuration viewed on the yz plane, and FIG. 9B shows a configuration viewed on the xz plane. This embodiment differs from the foregoing embodiments in that the projection optical system 314 includes two concave mirrors 316 and 318, and the two concave mirrors 316 and 318 are in a twisted arrangement.

The virtual image display device 310 includes an illumination unit 11, a display unit 12, and a projection optical system 314. The projection optical system 314 includes a first concave mirror 316 and a second concave mirror 318. The illumination unit 11, the display unit 12, and the second concave mirror 318 are arranged on the light axis extending in the x direction. The second concave mirror 318 is arranged such that the direction (axis D) orthogonal to both the direction of incidence and the direction of reflection of the image display light L is the y direction and reflects, in the z direction, the image display light L incident in the x direction. The first concave mirror 316 is arranged such that the direction (axis B) orthogonal to both the direction of incidence and the direction of reflection of the image display light L is the x direction and reflects the image display light L incident in the z direction toward the virtual image presentation plate 22.

Since the first concave mirror 316 and the second concave mirror 318 are in a twisted arrangement according to the embodiment, the astigmatism produced in the respective concave mirrors is made to occur in the opposite directions. The mechanism to mitigate the astigmatism by combining two concavely curved surfaces is as described in the first embodiment. Therefore, this embodiment can also reduce the astigmatism in the composite optical system 320 formed by the virtual image presentation plate 22 and the projection optical system 314 and enhance the imaging performance. Further, the occurrence of double images is inhibited by providing the display unit 12 at the focal point of the composite optical system 320 within the meridional plane. This can enhance the visibility of the virtual image 350.

It should be noted that this embodiment is applicable to a case where the first surface 23 of the virtual image presentation plate 22 is a flat surface. In this case, the astigmatism in the virtual image presentation plate 22 is negligible. It therefore suffices to set the curvature and the angles of incidence and reflection $\varphi_b$, $\varphi_d$ of the two concave mirrors 316, 318 respectively so as to reduce the astigmatism in the combination of the first concave mirror 316 and the second concave mirror 318.

In this embodiment, the projection optical system 314 is not provided with a convex lens, but an additional convex lens may be provided in the projection optical system 314. For example, an additional convex lens may be provided between the display unit 12 and the second concave mirror 318, or an additional convex lens may be provided between the second concave mirror 318 and the first concave mirror 316.

Fifth Embodiment

Figure 10:
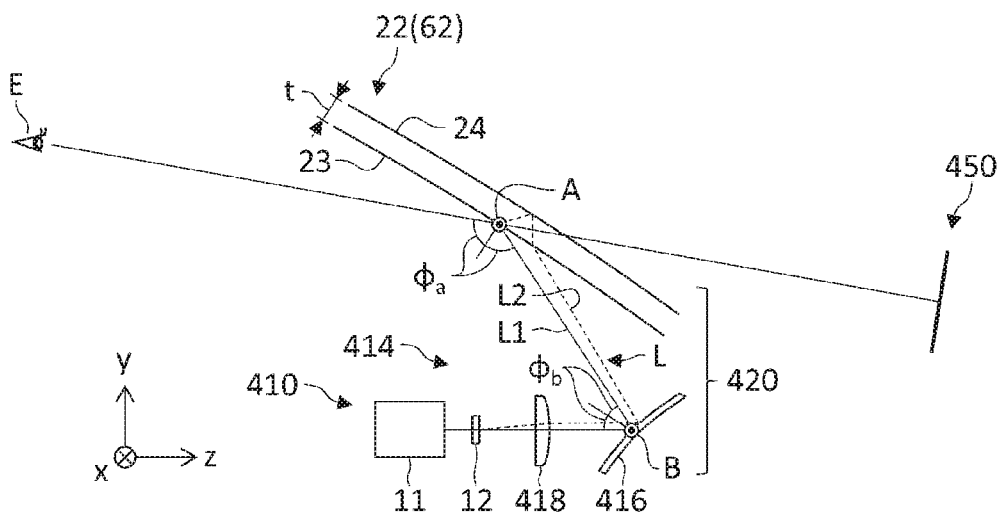
FIG. 10 shows a configuration of a virtual image display device according to the fifth embodiment in detail.

FIG. 10 shows a configuration of a virtual image display device 410 according to the fifth embodiment in detail. This embodiment differs from the foregoing embodiments in that a convex mirror 416 is used to mitigate the astigmatism produced in the virtual image presentation plate 22. In other words, the concavo-convex shapes of the virtual image presentation plate 22 and the projection mirror are reversed to produce the astigmatism in the respective curved surfaces in the opposite directions, thereby reducing the astigmatism in the composite optical system as a whole.

The virtual image display device 410 includes an illumination unit 11, a display unit 12, and a projection optical system 414. The projection optical system 414 includes a convex mirror 416 and a convex lens 418. The illumination unit 11, the display unit 12, the convex lens 418, and the convex mirror 416 are arranged on the light axis extending in the z direction. The convex mirror 416 is a projection mirror having a convexly curved surface of incidence and reflection of the image display light L. The convex mirror 416 is arranged such that the direction (axis B) orthogonal to both the direction of incidence and the direction of reflection of the image display light L is the x direction and reflects the image display light L incident in the z direction toward the virtual image presentation plate 22.

The virtual image presentation plate 22 is configured such that the first surface 23, on which the image display light L is incident, is concavely curved and is arranged such that the direction (axis A) orthogonal to both the direction of incidence and the direction of reflection of the image display light L is the x direction. The virtual image presentation plate 22 reflects the image display light L from the convex mirror 416 toward the user E.

According to this embodiment, the virtual image presentation plate 22 and the convex mirror 416 are arranged to face each other such that the respective curved surfaces have the opposite concavo-convex shapes. Therefore, the astigmatism produced in the respective curved surfaces is reduced or canceled. This reduces the astigmatism in a composite optical system 420 formed by the virtual image presentation plate 22 and the projection optical system 414 and enhances the imaging performance. Further, the occurrence of double images is inhibited by providing the display unit 12 at the focal point of the composite optical system 420 within the meridional plane. Thus, according to this embodiment, astigmatism and doubles images are both reduced, and the visibility of a virtual image 450 presented to the user E is enhanced.

The present invention has been described above with reference to the embodiment but is not limited to the embodiment. Appropriate combinations or replacements of the features of the illustrated examples are also encompassed by the present invention.

The embodiment described above shows that the astigmatism in the composite optical system is mitigated by using one of the features (1)-(5) described above. In one variation, a plurality of features may be combined. For example, the feature (2) or the feature (3) may be combined with the feature (1), or the feature (3) or the feature (4) may be combined with the feature (2). Also, the feature (4) or the feature (5) may be combined with the feature (3).

The embodiment described above shows that the first surface 23 of the virtual image presentation plate 22 is formed by a concavely curved surface or a flat surface. In one variation, the composite optical system may be configured to mitigate the astigmatism of the convexly curved first surface 23 of the virtual image presentation plate 22. In the case of the feature (1), the concave mirror 16 may be replaced by a convex mirror. In the case of the feature (2), curvature within the meridional plane may be larger than the curvature within the sagittal plane. In the case of the feature (5), the convex mirror 416 may be replaced by a concave mirror.

The embodiment described above shows that a convex lens is included in the projection optical system. In one variation, a convex lens may not be provided in the projection optical system. In the case of the embodiment shown in FIGS. 6A-6C, for example, the convex lens 18 may not be included in the projection optical system 14, and the display unit 12 may be provided at the focal point within the meridional plane of the composite optical system 20 not including the convex lens 18. Similarly, the convex lens 18 may not be included in the projection optical system 114 of the embodiment shown in FIG. 7, and the convex lens 218 may not be included in the projection optical system 214 of the embodiment shown in FIG. 8.

One embodiment of the disclosure is summarized below.
(Item 1-1)

A virtual image display device for presenting a virtual image to a user via a virtual image presentation plate, comprising:

a display unit that generates an image display light; and a projection optical system that includes a projection mirror that projects the image display light toward the virtual image presentation plate such that the image display light is incident and reflected on a first concavely curved surface of the virtual image presentation plate diagonally, wherein the projection mirror has a second concavely curved surface on which the image display light is incident and reflected diagonally and is arranged such that a direction orthogonal to both a direction of incidence and a direction of reflection of the image display light on the first concavely curved surface and a direction orthogonal to both a direction of incidence and a direction of reflection of the image display light on the second concavely curved surface are orthogonal to each other, and the display unit is provided at a focal point of a composite optical system within a meridional plane, the composite optical system being formed by the virtual image presentation plate and the projection optical system, and the focal point of the composite optical system within the meridional plane is a position of convergence of parallel beams assumed to be incident from the user toward the virtual image presentation plate along the meridional plane of the virtual image presentation plate.
(Item 1-2)

The virtual image display device according to item 1-1, wherein the projection mirror is configured such that a curvature in a second cross section intersecting the second concavely curved surface is larger than a curvature in a first cross section intersecting the second concavely curved surface, the first cross section is a plane that includes both the direction of incidence and the direction of reflection of the image display light incident on the second concavely curved surface diagonally, and the second cross section is a plane orthogonal to the first cross section and is a plane along a direction orthogonal to both the direction of incidence and the direction of reflection of the image display light incident on the second concavely curved surface diagonally.
(Item 1-3)

The virtual image display device according to item 1-1 or item 1-2, wherein the projection optical system further includes a plane parallel plate provided at an angle to a light path of the projection optical system.

(Item 2-1)

A virtual image display device for presenting a virtual image to a user via a virtual image presentation plate, comprising:

a display unit that generates an image display light; and a projection optical system that includes a projection mirror that projects the image display light toward the virtual image presentation plate, wherein the projection mirror has a concavely curved surface on which the image display light is incident and reflected diagonally and is arranged such that a curvature in a second cross section intersecting the concavely curved surface is larger than a curvature in a first cross section intersecting the concavely curved surface, the first cross section is a plane that includes both the direction of incidence and the direction of reflection of the image display light incident on the concavely curved surface diagonally, and the second cross section is a plane orthogonal to the first cross section and is a plane along a direction orthogonal to both the direction of incidence and the direction of reflection of the image display light incident on the concavely curved surface diagonally, the display unit is provided at a focal point of a composite optical system within a meridional plane, the composite optical system being formed by the virtual image presentation plate and the projection optical system, and the focal point of the composite optical system within the meridional plane is a position of convergence of parallel beams assumed to be incident from the user toward the virtual image presentation plate along the meridional plane of the virtual image presentation plate.

(Item 2-2)

The virtual image display device according to item 2-1, wherein the projection optical system further includes a plane parallel plate provided at an angle to a light path of the projection optical system.

(Item 3-1)

A virtual image display device for presenting a virtual image to a user via a virtual image presentation plate, comprising:

a display unit that generates an image display light; and a projection optical system that includes a projection mirror that projects the image display light toward the virtual image presentation plate, wherein the projection optical system includes a projection mirror that projects the image display light toward the virtual image presentation plate and a plane parallel plate that is provided at an angle to a light path of the projection optical system, the display unit is provided at a focal point of a composite optical system within a meridional plane, the composite optical system being formed by the virtual image presentation plate and the projection optical system, and the focal point of the composite optical system within the meridional plane is a position of convergence of parallel beams assumed to be incident from the user toward the virtual image presentation plate along the meridional plane of the virtual image presentation plate.

(Item 4-1)

A virtual image display device for presenting a virtual image to a user via a virtual image presentation plate, comprising:

a display unit that generates an image display light; and a projection optical system that projects the image display light toward the virtual image presentation plate, wherein the projection optical system includes a first concave mirror that reflects the image display light toward the virtual image presentation plate and a second concave mirror that reflects the image display light toward the first concave mirror, defining a plane along both a direction of incidence and a direction of output of the image display light on the virtual image presentation plate as a reference plane, the first concave mirror is oriented such that the image display light is incident on the first concave mirror in a direction along the reference plane, and the second concave mirror is oriented such that the image display light is incident on the second concave mirror in a direction intersecting the reference plane, and the display unit is provided at a focal point of a composite optical system within a meridional plane, the composite optical system being formed by the virtual image presentation plate and the projection optical system, and the focal point of the composite optical system within the meridional plane is a position of convergence of parallel beams assumed to be incident from the user toward the virtual image presentation plate along the meridional plane of the virtual image presentation plate.

(Item 4-2)

The virtual image display device according to item 4-1, wherein a curved surface of at least one of the first concave mirror and the second concave mirror is configured such that a curvature in a second cross section intersecting the curved surface is larger than a curvature in a first cross section intersecting the curved surface, the first cross section is a plane that includes both the direction of incidence and the direction of reflection of the image display light incident on the curved surface diagonally, and the second cross section is a plane orthogonal to the first cross section and is a plane along a direction orthogonal to both the direction of incidence and the direction of reflection of the image display light incident on the curved surface diagonally.

(Item 4-3)

The virtual image display device according to item 4-2, wherein the projection optical system further includes a plane parallel plate provided at an angle to a light path of the projection optical system.

(Item 5-1)

A virtual image display device for presenting a virtual image to a user via a virtual image presentation plate, comprising:

a display unit that generates an image display light; and a projection optical system that includes a projection mirror that projects the image display light toward the virtual image presentation plate such that the image display light is incident and reflected on a concavely curved surface of the virtual image presentation plate diagonally, wherein the projection mirror has a convexly curved surface on which the image display light is incident and reflected diagonally and is arranged such that a direction orthogonal to both a direction of incidence and a direction of reflection of the image display light on the concavely curved surface and a direction orthogonal to both a direction of incidence and a direction of reflection of the image display light on the convexly curved surface are parallel to each other, and the display unit is provided at a focal point of a composite optical system within a meridional plane, the composite optical system being formed by the virtual image presentation plate and the projection optical system, and the focal point of the composite optical system within the meridional plane is a position of convergence of parallel beams assumed to be incident from the user toward the virtual image presentation plate along the meridional plane of the virtual image presentation plate.

(Item 5-2)

The virtual image display device according to item 5-1, wherein the projection optical system further includes a plane parallel plate provided at an angle to a light path of the projection optical system.

It should be understood that the invention is not limited to the above-described embodiment but may be modified into various forms on the basis of the spirit of the invention. Additionally, the modifications are included in the scope of the invention.

What is claimed is:

1. A virtual image display device for presenting a virtual image to a user via a virtual image presentation plate, comprising:
   a display unit that generates an image display light; and
   a projection optical system that includes a projection mirror that projects the image display light toward the virtual image presentation plate such that the image display light is incident and reflected on a first concavely curved surface of the virtual image presentation plate diagonally, wherein
   the projection mirror has a second concavely curved surface on which the image display light is incident and reflected diagonally and is arranged such that a direction orthogonal to both a direction of incidence and a direction of reflection of the image display light on the first concavely curved surface and a direction orthogonal to both a direction of incidence and a direction of reflection of the image display light on the second concavely curved surface are orthogonal to each other, and
   the display unit is provided at a focal point of a composite optical system within a meridional plane, the composite optical system being formed by the virtual image presentation plate and the projection optical system, and the focal point of the composite optical system within the meridional plane is a position of convergence of parallel beams assumed to be incident from the user toward the virtual image presentation plate along the meridional plane of the virtual image presentation plate.

2. The virtual image display device according to claim 1, wherein
   the projection mirror is configured such that a curvature in a second cross section intersecting the second concavely curved surface is larger than a curvature in a first cross section intersecting the second concavely curved surface, the first cross section is a plane that includes both the direction of incidence and the direction of reflection of the image display light incident on the second concavely curved surface diagonally, and the second cross section is a plane orthogonal to the first cross section and is a plane along a direction orthogonal to both the direction of incidence and the direction of reflection of the image display light incident on the second concavely curved surface diagonally.

3. The virtual image display device according to claim 1, wherein
   the projection optical system further includes a plane parallel plate provided at an angle to a light path of the projection optical system.

4. The virtual image display device according to claim 1, wherein
   the virtual image presentation plate is a windshield provided in a vehicle and having a uniform thickness.

* * * * *